UNITED STATES PATENT OFFICE.

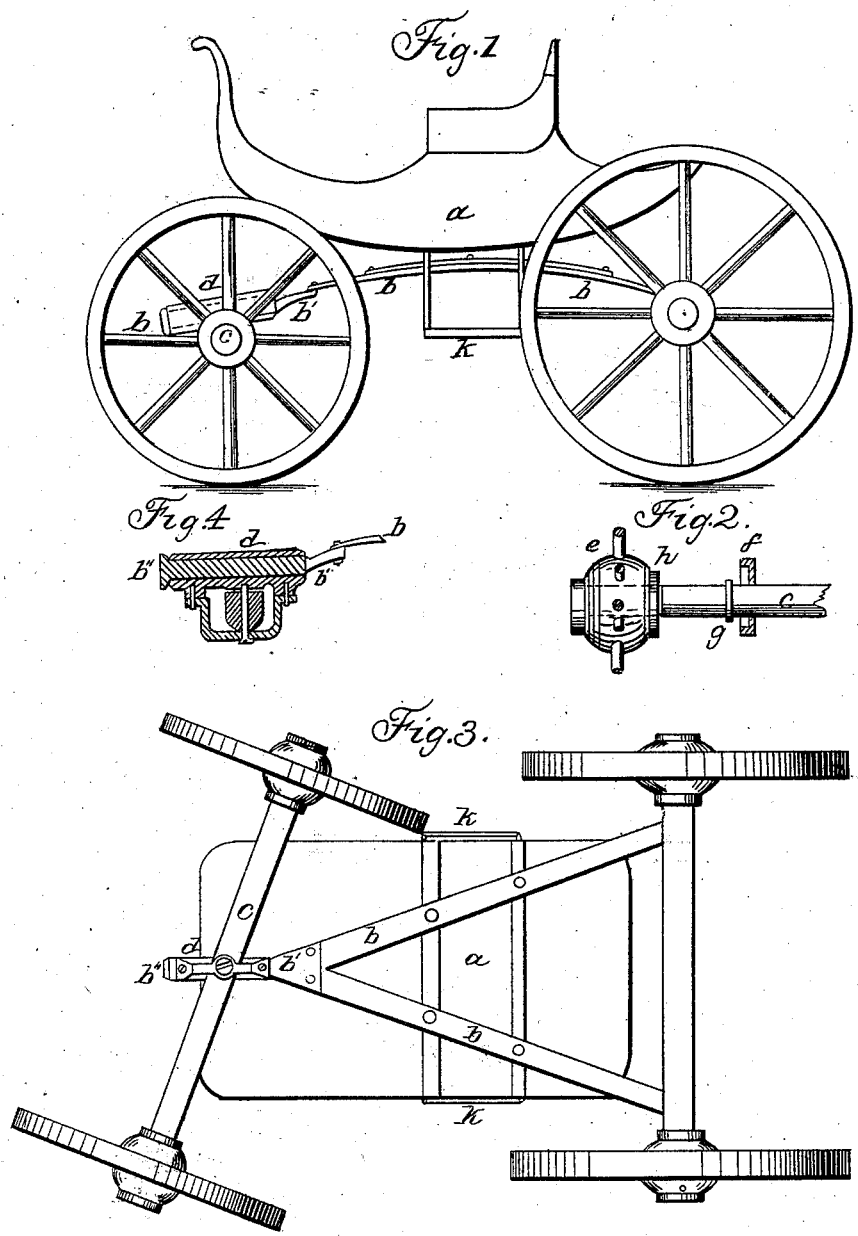

JAMES L. ROWLEY, OF STEUBEN COUNTY, INDIANA, ASSIGNOR TO JAS. L. ROWLEY AND R. H. GILSON.

CARRIAGE.

Specification of Letters Patent No. 11,085, dated June 13, 1854.

*To all whom it may concern:*

Be it known that I, JAMES L. ROWLEY, of Steuben county, Indiana, have invented certain new and useful Improvements in Riding-Vehicles, of which the following is a full, clear, and exact description, reference being had to the accompanying drawings, of which—

Figure 1 is a view of the spring reach from a side elevation of the carriage. Fig. 2 is a view of the wheel attachment to the axle. Fig. 3 is a view of the wear plate and step and the spring reach from an inverted plan. Fig. 4 is a vertical longitudinal section of the swivel joint.

My improvements are principally adapted to light vehicles, such as four wheel buggies. Instead of making the reach of the carriage of wood or of iron without spring, I make the entire reach of a spring, and so connect this spring with the front axle as to form a swivel joint, by which I dispense with quite a number of parts, bolts, screws, nuts, etc., and very materially reduce the cost of these carriages, while I attain more ease than in any light carriage with which I am acquainted. I also save expense in the wheel and axle attachment by means shortly to be described and also economize still further by so locating the carriage step as to make it answer for the "scrape" or "wear plate" against which the fore wheels rub in turning around the carriage.

($a$) represents the light carriage body supported upon the spring reach ($b, b$). The spring reach consists of two springs attached to the hind axle, which meet and are firmly united together before they reach the front axle, as at ($b'$). At the point of their junction they are attached to a strong round bolt of iron ($b''$), which passes through and plays freely in the socket ($d$), which socket is firmly secured to the front axle by iron straps or otherwise. The front extremity of the bolt $b''$ is prevented from slipping back by a common head or nut. This swivel joint thus formed allows the vertical swing or play of the axle, while it forms a strong attachment for the spring reach. My object being to attain lightness in every part, I adopt the wooden axle, which I make of uniform size throughout. The wheel is secured in the following manner. Upon the axle ($c$) there is secured a ring or flange of metal ($g$), which is designed when the wheel is pushed on the axle to play against the inner face of the hub. Beyond this flange there is a loose or detached rim ($f$) hollow upon that face which looks toward the hub, and like a cap or cover is designed to fit over the shoulder ($h$) upon the inner side of the hub. When the wheel is pushed on to the axle, up against the flange ($g$), the cap or detached hub rim ($f$) is drawn over the shoulder ($h$) and there secured by screws passing through it into the shoulder, or otherwise. Thus by having the gudgeon the same size as the axle I reduce the axle throughout and simplify the attachment. Next, to save the weight and expense of two wear plates, I so locate the step that in turning the fore wheels shall strike the step, as clearly shown in Fig. 3, where $k$ is the step with the wheel in contact.

What I claim as my invention and desire to secure by Letters Patent is—

The employment of a spring reach in combination with the swivel joint on the front end of the same substantially in the manner set forth.

J. L. ROWLEY.

Witnesses:
TOLMIE CAMPBELL,
M. L. GRITZNER.